(12) United States Patent
Johnson et al.

(10) Patent No.: US 12,403,602 B2
(45) Date of Patent: *Sep. 2, 2025

(54) ROBOT INTERACTION WITH HUMAN CO-WORKERS

(71) Applicant: DEXAI ROBOTICS, INC., San Diego, CA (US)

(72) Inventors: David M. S. Johnson, Cambridge, MA (US); Syler Wagner, Somerville, MA (US); Steven Lines, Brookline, MA (US); Mitchell Hebert, Littleton, CO (US); Connor Lawson, Cambridge, MA (US)

(73) Assignee: DEXAI ROBOTICS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,877

(22) Filed: Dec. 15, 2023

(65) Prior Publication Data

US 2024/0227189 A1 Jul. 11, 2024

Related U.S. Application Data

(63) Continuation of application No. 16/570,606, filed on Sep. 13, 2019, now Pat. No. 11,872,702.

(Continued)

(51) Int. Cl.
*B25J 9/16* (2006.01)
*G05B 19/4061* (2006.01)

(52) U.S. Cl.
CPC ............. *B25J 9/1666* (2013.01); *B25J 9/161* (2013.01); *B25J 9/1653* (2013.01); *B25J 9/1664* (2013.01);

(Continued)

(58) Field of Classification Search
CPC ........ B25J 9/1666; B25J 9/161; B25J 9/1653; B25J 9/1664; B25J 9/1674; B25J 9/1676;
(Continued)

(56) References Cited

U.S. PATENT DOCUMENTS 9,981,383 B1 * 5/2018 Nagarajan .............. B25J 9/1666
2004/0230340 A1 * 11/2004 Fukuchi ................. G05D 1/027
318/568.12

(Continued)

FOREIGN PATENT DOCUMENTS

JP 2005515910 A * 6/2005
WO WO-2017197170 A1 * 11/2017

OTHER PUBLICATIONS

Wong, J.M., et al., "SegICP: integrated Deep Semantic Segmentation and Pose Estimation", Sep. 2017, Massachusetts institute of Technology, 2017 IEEE/RSJ International Conference on Intelligent Robots and Systems (IROS) (Year: 2017).*

(Continued)

*Primary Examiner* — Abby Y Lin
*Assistant Examiner* — Karston G. Evans
(74) *Attorney, Agent, or Firm* — INNOVATION CAPITAL LAW GROUP, LLP; Vic Lin

(57) ABSTRACT

Embodiments provide functionality to prevent collisions between robots and objects. An example embodiment detects a type and a location of an object based on a camera image of the object, where the image has a reference frame. Motion of the object is then predicted based on at least one of: the detected type of the object, the detected location of the object, and a model of object motion. To continue, a motion plan for the robot is generated that avoids having the robot collide with the object based on the predicted motion of the object and a transformation between the reference frame of the image and a reference frame of the robot. The (Continued)

robot can be controlled to move in accordance with the motion plan or a signal can be generated that controls the robot to operate in accordance with the motion plan.

19 Claims, 9 Drawing Sheets

Related U.S. Application Data

(60) Provisional application No. 62/731,398, filed on Sep. 14, 2018, provisional application No. 62/730,934, filed on Sep. 13, 2018, provisional application No. 62/730,918, filed on Sep. 13, 2018, provisional application No. 62/730,933, filed on Sep. 13, 2018, provisional application No. 62/730,947, filed on Sep. 13, 2018, provisional application No. 62/730,703, filed on Sep. 13, 2018.

(52) U.S. Cl.
CPC ......... *B25J 9/1674* (2013.01); *B25J 9/1676* (2013.01); *B25J 9/1697* (2013.01); *G05B 19/4061* (2013.01); *G05B 2219/39091* (2013.01); *G05B 2219/40202* (2013.01)

(58) Field of Classification Search
CPC . B25J 9/1697; B25J 9/0009; B25J 9/16; B25J 9/1633; B25J 9/1687; B25J 11/0045; B25J 13/003; B25J 13/085; B25J 13/088; B25J 15/0052; B25J 15/0408; B25J 19/0083; B25J 19/023; B25J 9/1682; B65G 1/137; G05B 19/4061; G05B 2219/32335; G05B 2219/39001; G05B 2219/39091; G05B 2219/40202; G05B 2219/40497; G05B 2219/49157; G05B 2219/39319; G05B 2219/39342; G05B 2219/39468; G05B 2219/40201; G05B 2219/40411; G06N 3/08; G06Q 10/06316; G10L 15/22; A47J 44/00
See application file for complete search history.

(56) References Cited

U.S. PATENT DOCUMENTS

| | | | | |
|---|---|---|---|---|
| 2006/0184274 | A1* | 8/2006 | Sakai | G05D 1/0246 700/245 |
| 2009/0326711 | A1* | 12/2009 | Chang | B25J 9/1666 700/255 |
| 2016/0059412 | A1 | 3/2016 | Oleynik | |
| 2017/0178352 | A1* | 6/2017 | Harmsen | G05D 1/106 |
| 2017/0190051 | A1* | 7/2017 | O'Sullivan | G05D 1/0088 |
| 2018/0147718 | A1 | 5/2018 | Oleynik | |
| 2019/0012807 | A1* | 1/2019 | Sun | G06T 7/60 |
| 2019/0049987 | A1* | 2/2019 | Djuric | G06N 3/08 |
| 2019/0220016 | A1* | 7/2019 | Phillips | B60W 30/18163 |
| 2022/0226991 | A1* | 7/2022 | Kast | G05B 19/4155 |

OTHER PUBLICATIONS

Ruiter, Hans de, et al., "Tracking of Rigid-Bodies for Autonomous Surveillance", Jul. 2005, Proceedings of the IEEE International Conference on Mechatronics & Automation Niagara Falls, Canada, pp. 928-933 (Year: 2005).*

Vondrak, M., et al., "Physical Simulation for Probabilistic Motion Tracking," 2008 IEEE Conference on Computer Vision and Pattern Recognition, pp. 1-8 (Year: 2008).*

Unterholzner, A., et al., "Active Perception for Autonomous Vehicles," 2012 IEEE International Conference on Robotics and Automation, pp. 1620-1627 (Year: 2012).*

Zhang, L., et al., "A Dynamic Bayesian Approach to Real-Time Estimation and Filtering in Grasp Acquisition," 2013 IEEE International Conference on Robotics and Automation (ICRA), pp. 85-92 (Year: 2013).*

* cited by examiner

ROBOT INTERACTION WITH HUMAN CO-WORKERS

RELATED APPLICATIONS

This application is a continuation of U.S. application Ser. No. 16/570,606, filed on Sep. 13, 2019, which claims the benefit of U.S. Provisional Application No. 62/731,398, filed on Sep. 14, 2018, U.S. Provisional Application No. 62/730,703, filed on Sep. 13, 2018, U.S. Provisional Application No. 62/730,947, filed on Sep. 13, 2018, U.S. Provisional Application No. 62/730,933, filed on Sep. 13, 2018, U.S. Provisional Application No. 62/730,918, filed on Sep. 13, 2018 and U.S. Provisional Application No. 62/730,934, filed on Sep. 13, 2018.

This application is related to U.S. patent application Ser. No. 16/570,100, U.S. patent application Ser. No. 16/570,855, U.S. patent application Ser. No. 16/570,955, U.S. patent application Ser. No. 16/571,003, U.S. patent application Ser. No. 16/570,915, U.S. patent application Ser. No. 16/570,976, U.S. patent application Ser. No. 16/570,736, U.S. patent application Ser. No. 16/571,025, U.S. patent application Ser. No. 16/571,040, and U.S. patent application Ser. No. 16/571,041, all filed on the same day, Sep. 13, 2019.

The entire teachings of the above applications are incorporated herein by reference.

BACKGROUND

Traditionally, the food industry employs human labor to manipulate ingredients with the purpose of either assembling a meal such as a salad or a bowl, or packing a box of ingredients such as those used in grocery shopping, or preparing the raw ingredients. Robots have not yet been able to assemble complete meals from prepared ingredients in a food-service setting such as a restaurant, largely because the ingredients are arranged unpredictably and change shape in difficult-to-predict ways rendering traditional methods to move material ineffective without extensive modifications to existing kitchens. Additionally, traditional material handling methods are ill-suited to moving cooked foods without altering their texture and taste-profile. These difficulties arise because the friction, stiction, and viscosity of commonly consumed foods cause auger, conveyor, and suction mechanisms to become clogged and soiled, while these mechanisms simultaneously impart forces on the foodstuffs which alter their texture, consistency, and taste-profile in unappetizing ways.

SUMMARY

In order for robots to operate in high-traffic, fast-paced environments, such as restaurant kitchens, the robots must be able to detect obstacles, e.g., humans and objects, and modify their motion to not-only avoid collision, but also allow both the obstacle, e.g., human, and the robot, to accomplish their tasks. A kitchen robot consisting of an articulated robot arm is able to perform tasks such as removing ingredients from a source container and placing them into a destination container as part of meal preparation. A human chef may need to also add ingredients to either of the containers or perform a process step on one of the containers, such as placing it into an oven. In order for the chef to safely and efficiently work in the same domain as the robot, the robot must recognize humans (the chef) and modify its motion so as to not harm the human and to allow both the robot and human to perform their motions as quickly and as efficiently as possible.

Embodiments of the present invention provide methods and systems for controlling a robot to move in such a way so as to avoid collision with both static and moving obstacles, such as inanimate objects, humans, animals, or other robots, amongst other examples, while still accomplishing a task. Embodiments may be employed in shared workspaces so that a robot and a human co-worker can safely collaborate.

Safe human-robot collaboration in a shared workspace requires the robot to maintain an awareness of the location of the robot's human co-worker to avoid executing motion which would cause the robot to collide with the human and possibly physically injure the human. The robot motion must also not cause any near misses (motions which come close enough to the obstacle to startle or cause concern in the human). Extending the time horizon of sensed objects in the robot's environment into the future and predicting the human's or obstacle's motion increases safety of operation because the robot can consider the future motion of the human co-worker or obstacle when determining and generating trajectories, e.g., motion plans.

An embodiment of the present disclosure provides a method for controlling a robot for object avoidance. Such a method detects a type and a location of an object based on a camera image of the object, where the image has a reference frame. The method continues by predicting motion of the object based on at least one of the detected type of the object, the detected location of the object, and a model of object motion. In turn, a motion plan for a robot is generated that avoids having the robot collide with the object. According to an embodiment, the motion plan is generated based on the predicted motion of the object and a transformation between the reference frame of the image and a reference frame of the robot.

In an embodiment, generating the motion plan for the robot includes determining the transformation between the reference frame of the image and the reference frame of the robot and determining a transformation between a reference frame of the object and a reference frame of the camera. In such an embodiment, the generated motion plan is based on the determined transformations (the determined transformation between the reference frame of the image and the reference frame of the robot and the determined transformation between the reference frame of the object and the reference frame of the camera).

Embodiments may prevent object/robot collisions for any objects. For example, in an embodiment, the object is at least one of: an inanimate object undergoing ballistic motion; an inanimate object being acted upon by internal or external forces; a human; an animal; and another robot.

In another embodiment, the detected location of the object is a six degree-of-freedom (6DOF) pose, including an x-position, y-position, z-position, roll, pitch, and yaw of the object, represented in the reference frame of the image. In one such embodiment, predicting motion of the object is further based on the 6DOF pose of the object as represented in the reference frame of the image. Embodiments may employ a variety of methods to detect the location of the object. According to an embodiment, detecting the location of the object includes processing the image of the object through a convolutional neural network to predict one or more parts of the object forming a two-dimensional (2D) position of the object in the image. Next, such an embodiment, determines the 6DOF pose using the 2D position of the object in the image, pixels of the object, and a depth map corresponding to the image of the object. In such an embodiment, determining the 6DOF pose using the 2D position of the object, the depth map corresponding to the image of the object, and the pixels of the object may include fitting the depth map to a candidate three-dimensional (3D) model of the object, where dimensions of the 3D model match dimensions of the object.

An embodiment detects the location of the object by processing the image of the object using a neural network to directly determine a six degree-of-freedom pose of the object in the reference frame of the image. In such an embodiment, processing the image of the object using the neural network includes at least one of (i) determining pixels in the image belonging to the object and determining the location of the object by matching the determined pixels to a silhouette and (ii) labelling each pixel in the image with a feature vector, wherein at least one of the feature vectors is matched to a feature vector of a reference model of a class of the object to determine relative orientation and position of the at least one feature vector in the reference frame of the image.

Embodiments may utilize a variety of methods, alone or in combination, to predict motion of the object based on at least one of the detected type of the object, the detected location of the object, and the model of object motion. For instance, embodiments may process the image of the object using a neural network trained to estimate future position of the object based on at least one image of the object having a reference frame. An embodiment may also predict motion by processing the image of the object using a neural network trained to determine motion of the object based on a successive set of images. Yet another embodiment performs a simulation to predict motion of the object. In such an embodiment, the simulation is performed using (i) a physics-based dynamics model of the object with velocity and acceleration inputs obtained by differentiating successive poses of the object and (ii) a Bayesian estimator configured to employ a fixed set of equations of motion which model motion of the object. Embodiments may also predict motion by processing images of the object using an optical flow that tracks motion of pixels associated with the object in the image and determines center-of-mass velocity of the object. Moreover, an embodiment may examine, i.e., search, a database of recorded candidate object motions and interpolate between the candidate object motions to determine the predicted motion of the object. Further still, an embodiment predicts motion by determining occupancy of the object in one or more safety zones around the detected location of the object. In such an embodiment, occupancy is determined based on (i) object pose, i.e., location, or (ii) transforming depth estimates of pixels in the image, which are segmented and determined to belong to the object, into a point cloud in the reference frame of the robot.

An embodiment that predicts motion of the object by performing a simulation using a physics-based dynamics model further includes selecting equations to include in the physics-based dynamics model of the object from a set of plausible models by matching the detected type of the object to an element in a library of models.

Embodiments use a variety of techniques, alone or in combination, to detect the type of the object. For instance, an embodiment processes the image of the object using a neural network classifier configured to predict object type based on one or more images of an object. Another embodiment performs color matching on the image of the object to detect the type. Yet another embodiment detects a label indicating object type in the image of the object. Further still, embodiments process the image of the object to detect motion of the object and identify the type of the object based on the detected motion. Another embodiment detects the object type by comparing a depth image of the object to 3D object models to identify a matching object model. Further, yet another embodiment detects the type of the object by processing a depth image of the object using a neural network configured to predict object type based on one or more depth images of an object.

An embodiment generates a motion plan for the robot by selecting a given motion plan from a library of candidate motion plans, where heuristics are used to select between the candidate motion plans. Another embodiment generates the motion plan by re-planning, in real-time, a previously planned motion plan for the robot using a neural network configured to generate a motion plan using the predicted motion of the object as an input. Yet another embodiment uses a sampling-based motion planner, such as rapidly-exploring random trees, to generate a motion plan, which can be implemented using principles known to those skilled in the art. Another embodiment uses one of a variety of search-based path planners which can be implemented using principles known to those skilled in the art.

In an embodiment, predicting motion of the object includes predicting collision of the robot and the object. Embodiments predict collision using at least one of: (i) geometric overlap based on 3D models of the robot and the object, (ii) a neural network, and (iii) bounding box overlap. In an embodiment, the geometric overlap, neural network, and bounding box overlap can be implemented using principles known in the art.

An example embodiment predicts the motion of the object to be zero motion. Such an embodiment generates a motion plan for the robot that avoids the stationary object. Yet another embodiment generates a motion plan for the robot that includes stopping until the object is removed from an environment of the robot.

Embodiments may also predict motion and determine collision avoidance behavior using context as described in U.S. patent application Ser. No. 16/570,736 and U.S. patent application Ser. No. 16/571,025. For example, during dangerous motions, such as using a cutting instrument or where high force is required, the safe action when a human is detected in the work space may be to cease motion or move as far from the detected human as possible, while reducing applied torque to the robot joints to be below a safe threshold.

Further, embodiments may generate the motion plan for the robot based on properties of the robot. For example, in an embodiment, the motion plan is further generated based on dynamic limits of the robot, where the dynamic limits of the robot are a function of the detected type of the object and the predicted motion of the object. Another embodiment includes selecting the model of object motion based on the detected type of the object.

Further, embodiments may utilize any variety of image types. For instance, in an embodiment, the image of the object is at least one of: a depth image of the object and a red, green, blue (RGB) image of the object.

An embodiment is directed to a system that includes a robot and a vision system. In such a system embodiment, the robot is controlled through use of the vision system according to any one of the embodiments described herein. Another embodiment is directed to a system for controlling a robot for object avoidance that includes a processor and a memory with computer code instructions stored thereon. In such an embodiment, the processor and the memory, with the computer code instructions, are configured to cause the system to implement any embodiments described herein.

Yet another embodiment is directed to a computer program product for controlling a robot for object avoidance. The computer program product comprises a computer-readable medium with computer code instructions stored thereon where, the computer code instructions, when executed by a processor, cause an apparatus associated with the processors to perform any embodiments described herein.

Another embodiment determines a location of an object, i.e., a pose of an object to determine if the object is ingressing, i.e., approaching or entering, within a defined safety region surrounding a robot. In such an embodiment, if the object is ingressing within a safety region, the robot is paused along its existing trajectory. According to an embodiment, the new pause trajectory is determined to be jerk limited (fastest possible stop) based on dynamics of the robot and a payload of the robot. Such an embodiment stops the robot as quickly as possible while avoiding damage to the robot and the robot's payload. For instance, such an embodiment can stop the robot while preventing the robot from spilling a substance the robot is carrying. Such an embodiment can be further modified by determining geometry of the object. If geometry of the object (or an estimate) can be determined, the ingressing object's geometry is used to verify that newly generated paths avoid collision with the ingressing object. Such an embodiment can check if the robot's trajectory can be re-planned based on the new collision geometry. If the trajectory can be re-planned, then such an embodiment proceeds and re-plans the trajectory. If the trajectory cannot be re-planned the robot can simply be stopped to mitigate the collision.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
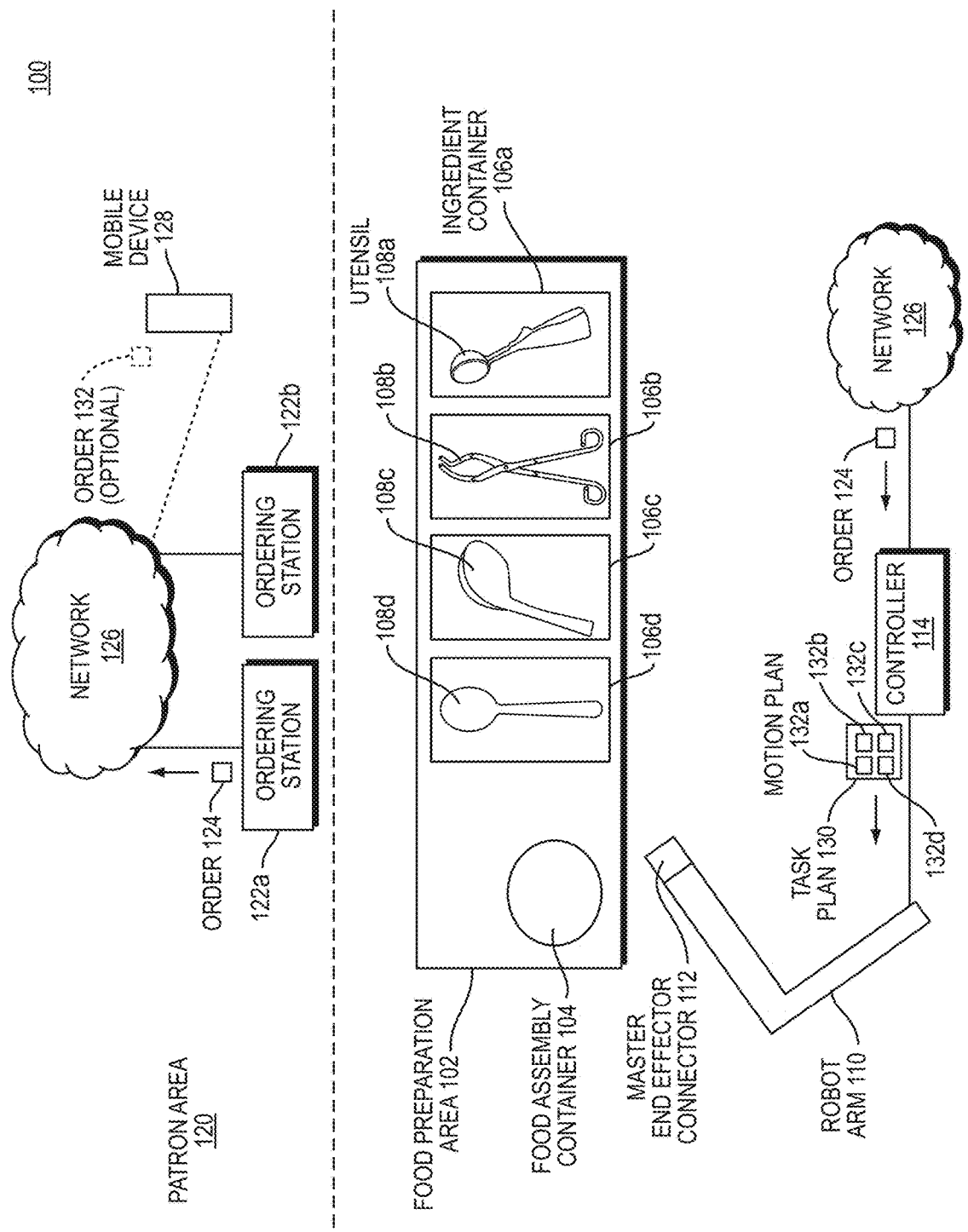
FIG. 1 is a block diagram illustrating an example embodiment of a quick service food environment of embodiments of the present invention.

Embodiments of the present invention provide functionality for robot-object collision avoidance. Such functionality can be employed in any variety of environments in which avoiding collisions between robots and objects, e.g., humans, is desired. FIG. 1 illustrates a food preparation environment 100 in which embodiments may be employed.

Operating a robot in a food preparation environment, such as a quick service restaurant, can be challenging for several reasons. First, the end effectors (e.g., utensils), that the robot uses need to remain clean from contamination. Contamination can include allergens (e.g., peanuts), dietary preferences (e.g., contamination from pork for a vegetarian or kosher customer), dirt/bacteria/viruses, or other non-ingestible materials (e.g., oil, plastic, or particles from the robot itself). Second, the robot should be operated within its design specifications, and not exposed to excessive temperatures or incompatible liquids, without sacrificing cleanliness. Third, the robot should be able to manipulate food stuffs, which are often fracturable and deformable materials, and further the robot must be able to measure an amount of material controlled by its utensil in order to dispense specific portions. Fourth, the robot should be able to automatically and seamlessly switch utensils (e.g., switch between a ladle and salad tongs). Fifth, the utensils should be adapted to be left in an assigned food container and interchanged with the robot as needed, in situ. Sixth, the interchangeable parts (e.g., utensils) should be washable and dishwasher safe. Seventh, the robot should be able to autonomously generate a task plan and motion plan(s) to assemble all ingredients in a recipe, and execute that plan. Eighth, the robot should be able to modify or stop a motion plan based on detected interference or voice commands to stop or modify the robot's plan. Ninth, the robot should be able to minimize the applied torque based on safety requirements or the task context or the task parameters (e.g., density and viscosity) of the material to be gathered. Tenth, the system should be able to receive an electronic order from a user, assemble the meal for the user, and place the meal for the user in a designated area for pickup automatically with minimal human involvement.

FIG. 1 is a block diagram illustrating an example embodiment of a quick service food environment 100 of embodiments of the present disclosure. The quick service food environment 100 includes a food preparation area 102 and a patron area 120.

The food preparation area 102 includes a plurality of ingredient containers 106a-d each having a particular foodstuff (e.g., lettuce, chicken, cheese, tortilla chips, guacamole, beans, rice, various sauces or dressings, etc.). Each ingredient container 106a-d stores in situ its corresponding ingredients. Utensils 108a-d may be stored in situ in the ingredient containers or in a stand-alone tool rack (not shown). The utensils 108a-d can be spoons, ladles, tongs, dishers (scoopers), spatulas, or other utensils. Each utensil 108a-e is configured to mate with and disconnect from a tool changer interface 112 of a robot arm 110. While the term utensil is used throughout this application, a person having ordinary skill in the art can recognize that the principles described in relation to utensils can apply in general to end effectors in other contexts (e.g., end effectors for moving fracturable or deformable materials in construction with an excavator or backhoe, etc.); and a robot arm can be replaced with any computer controlled actuatable system which can interact with its environment to manipulate a deformable material.

The robot arm 110 includes sensor elements/modules such as stereo vision systems (SVS), 3D vision sensors (e.g., Microsoft Kinect™ or an Intel RealSense™), LIDAR sensors, audio sensors (e.g., microphones), inertial sensors (e.g., internal motion unit (IMU), torque sensor, weight sensor, etc.) for sensing aspects of the environment, including pose (i.e., X, Y, Z coordinates and roll, pitch, and yaw angles) of tools for the robot to mate, shape and volume of foodstuffs in ingredient containers, shape and volume of foodstuffs deposited into food assembly container, moving or static obstacles in the environment, etc.

To initiate an order, a patron in the patron area 120 enters an order 124 in an ordering station 122*a-b*, which is forwarded to a network 126. Alternatively, a patron on a mobile device 128 can, within or outside of the patron area 120, generate an optional order 132. Regardless of the source of the order, the network 126 forwards the order to a controller 114 of the robot arm 110. The controller generates a task plan 130 for the robot arm 110 to execute.

The task plan 130 includes a list of motion plans 132*a-d* for the robot arm 110 to execute. Each motion plan 132*a-d* is a plan for the robot arm 110 to engage with a respective utensil 108*a-e*, gather ingredients from the respective ingredient container 106*a-d*, and empty the utensil 108*a-e* in an appropriate location of a food assembly container 104 for the patron, which can be a plate, bowl, or other container. The robot arm 110 then returns the utensil 108*a-e* to its respective ingredient container 106*a-d*, a tool rack (not shown), or other location as determined by the task plan 130 or motion plan 132*a-d*, and releases the utensil 108*a-d*. The robot arm executes each motion plan 132*a-d* in a specified order, causing the food to be assembled within the food assembly container 104 in a planned and aesthetic manner.

Within the above environment, various of the above described problems can be solved. The environment 100 illustrated by FIG. 1 can improve food service to patrons by assembling meals faster, more accurately, and more sanitarily than a human can assemble a meal. Some of the problems described above can be solved in accordance with the disclosure below.

For instance, in the environment 100, it may be necessary for a human to be in close proximity with the robot arm 110. Embodiments of the present disclosure can be employed to avoid collisions between the robot arm 110 and a human or other object.

While methods exist for preventing robot-object collisions, the existing methods are inadequate. Many human-robot collaboration safety systems rely on dedicated hardware worn by the human that aids in the motion tracking or rely on fixed physical sensors in the workspace which detect the presence of a human (or stray cat, dog, mouse, or other object to be avoided). The existing systems only provide a binary signal (e.g., human present or no human present), and modify the robot behavior according to that binary signal. Typically, the modification is slowing down the robot or stopping the robot's motion, instead of allowing the robot to continue working by modifying the robot's motion/task plan to avoid a collision.

Embodiments of the invention provide a more nuanced method for a robot to interact with a human co-worker or any other object in the robot's operating environment. Instead of a binary signal that only indicates the presence or absence of an obstacle, embodiments predict the future location of an object based on a vision system and react to the current state of the object and the object's predicted motion in controlling motion of the robot. Using a binary signal or using only the object/obstacle's current position to avoid collisions is insufficient because objects can move rapidly. Embodiments add a predictive future estimate of where the object will be and use that future estimate to modify existing motion plans of the robot to anticipate the future motion of the object. In other words, embodiments consider future/predicted movement of obstacles in path planning for the robot. Such functionality provides robust collision avoidance and behavior which appears natural to human co-workers. Thus, embodiments allow for safe human-robot and object-robot collaboration in a shared workspace, even in the case where the robot is moving quickly and using potentially dangerous utensils.

While, at points, embodiments are described herein as preventing robot-human collision, embodiments of the present disclosure are not so limited and can be used to prevent collision between robots and any objects. For example, embodiments can extend to objects other than people (e.g., animals) or other robots which are not necessarily networked to the current robot and can also extend to moving inanimate objects such as falling or dropped objects. Further, it is noted that while embodiments are described herein as being employed in food service environments, embodiments are not so limited and may be employed in any environments in which robot-object collision avoidance is desired.

Figure 2A:
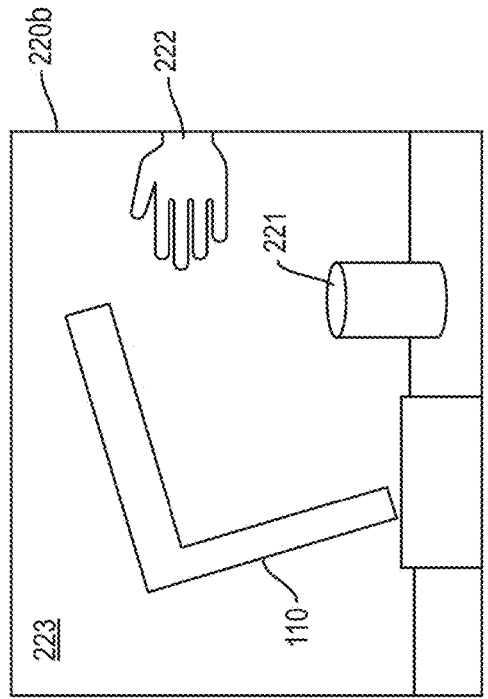
FIGS. 2A-C are block diagrams illustrating a method for object avoidance in an environment according to an embodiment.
Figure 2B:
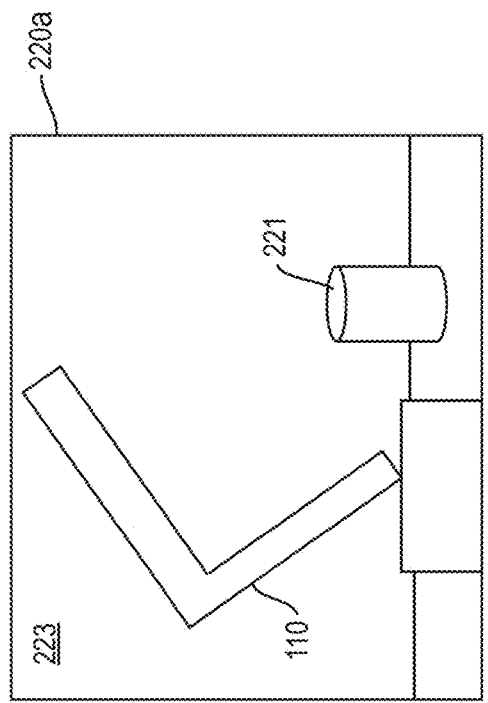
Figure 2C:
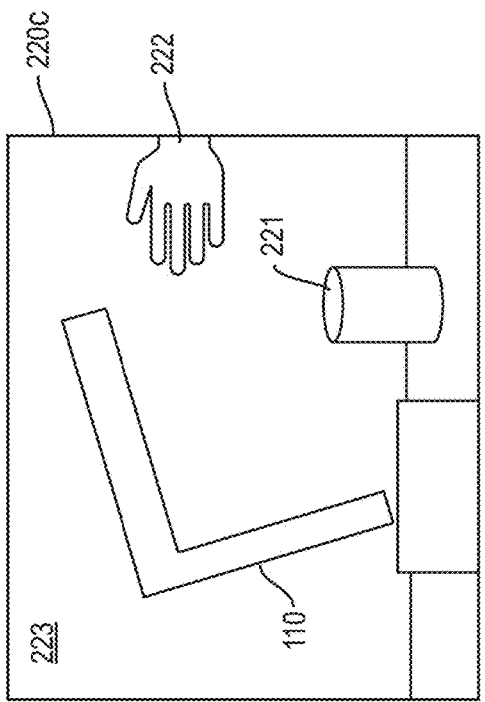

FIGS. 2A-C illustrate a method for object avoidance in the environment 223 according to an embodiment. FIG. 2A depicts an image 220*a* (with a reference frame) of the environment 223 at a first time. FIG. 2B depicts an image 220*b* (with a reference frame) of the environment 223 at a second time. FIG. 2C depicts an image 220*c* (with a reference frame) of the environment 223 at a third time.

In FIG. 2A, the robot 110 is performing a function with the container 221, e.g., removing material from the container 221. In the image 220*b* the robot 110 has moved closer to the container 221 and the hand 222 appears. Embodiments described herein implement functionality to prevent a collision between the robot 110 and the hand 222.

In one such example embodiment, the image 220*b* with the reference frame is processed to detect the type and location of the object, i.e., the hand 222. In such an embodiment, the location of the hand 222 is determined and the object (the hand 222) is detected to be of a human hand type. Next, motion of the hand 222 is predicted based on at least one of the detected type, the detected location, and a model of object motion. In the example of FIGS. 2A-C, the model of object motion is selected, based on the detected type of human hand, to be a human motion model. Further, based on the motion model which indicates movement toward an object, e.g., the can 221, and the location of the hand 222, it is predicted that the motion of the hand 222 is toward the can 221. In turn, based on the predicted motion of the hand 222 (toward the can 221) and a transformation between the reference frame of the robot 110 and the reference frame of the image 220*b* of the environment 223, a motion plan to stop the robot 110 is determined. In the example of FIGS. 2A-C the motion plan stops the robot's 110 motion because of the possibility of injury to the hand 222. However, embodiments are not so limited and motion plans may be determined so that the robot can continue its task while avoiding the hand 222.

Figure 3:
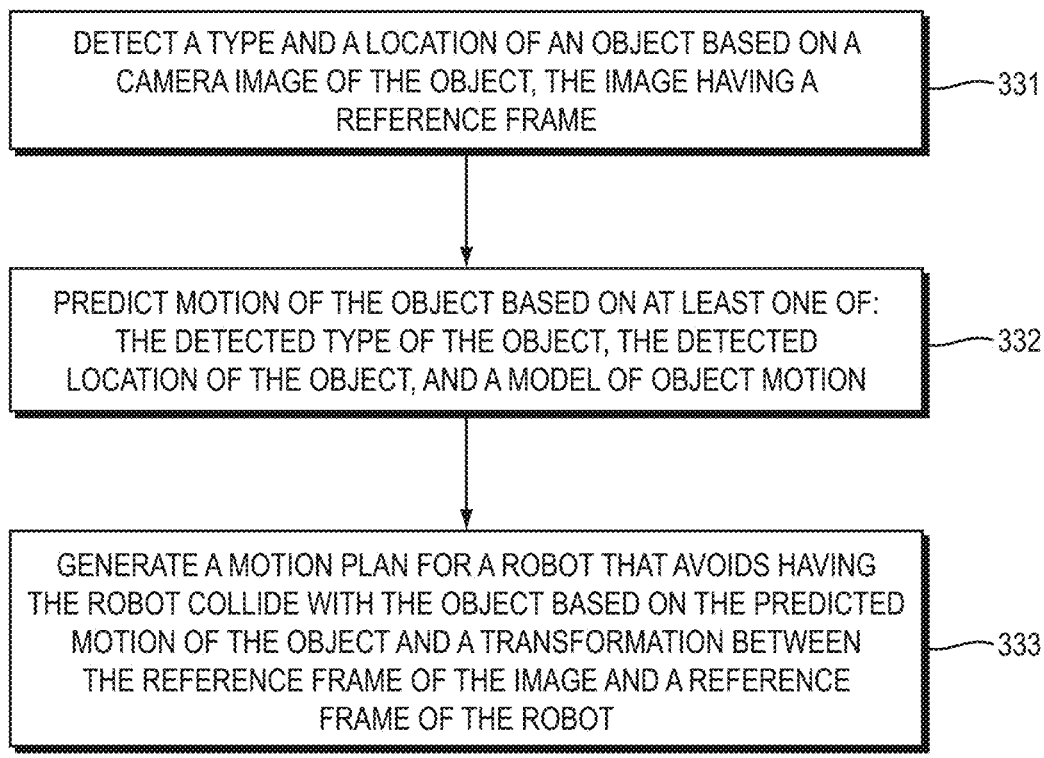
FIG. 3 is a flowchart depicting a method for controlling a robot to avoid an obstacle according to an embodiment.

FIG. 3 is a flow chart of a method 330 for controlling a robot to avoid an obstacle according to an embodiment. The method 330 is computer implemented and may be performed via any combination of hardware and software as is known in the art. For example, the method 330 may be implemented via one or more processors with associated memory storing computer code instructions that cause the processor to implement steps 331, 332, and 333 of the method 330.

The method 330, at 331, detects a type and a location of an object based on a camera image of the object, where the image has a reference frame. In embodiments, the camera can be located in any location sufficient to capture images of the environment in which collision avoidance between the robot and objects is desired. For instance, the camera can be located on the robot or in the environment in which the robot is operating. The reference frame of the image refers to the spatial location and orientation of the camera image sensor. The transformation between the image reference frame and the robot reference frame is known in order to locate objects which are detected in the image reference frame with respect to the robot.

The method 330 continues at 332 by predicting motion of the object based on at least one of (i) the detected type of the object, (ii) the detected location of the object, and (iii) a model of object motion. It is noted that because 332 uses at least one of the detected type and the detected location, an alternative embodiment of the method 330, at 331, only detects the type or the location, rather than both the type and the location.

To continue, at 333, a motion plan for a robot is generated that avoids having the robot collide with the object. According to an embodiment, the motion plan is generated at 333 based on the predicted motion of the object and a transformation between the reference frame of the image and a reference frame of the robot. According to an embodiment, the reference frame of the robot is the spatial location and orientation of a link of the robot where all other links of the robot can be deterministically located with respect to that link. The transformation between the reference frame of the image and reference frame of the robot allows the physical location of the object with respect to the robot to be determined. In an embodiment, the transformation between the reference frame of the image and the reference frame of the robot can be predetermined using principles known in the art. Further, embodiments may determine the transformation using a variety of methods. For example, the camera can be used to locate a feature on the robot and determine it's pose. By simultaneously knowing the pose of the feature in both the robot frame and the image frame, the transformation between the two frames can be determined. Additionally, the robot may move the camera to take a series of measurements of the pose of a third, fixed object. By knowing how the robot moves the camera and the measurements of the object pose in the camera frame, the transformation between the camera and the robot may be determined. In an embodiment, the transformation is based on location of the camera and is determined using principles known to those of skill in the art. Further, embodiments can utilize a transformation that is known to be accurate within a tolerance of obstacle avoidance. According to an embodiment, the motion plan may also be generated at 333 based on physical characteristics, e.g., size and shape, of the object being avoided.

In an embodiment, generating the motion plan for the robot at 333 includes determining the transformation between the reference frame of the image and the reference frame of the robot and determining a transformation between a reference frame of the object and a reference frame of the camera. According to an embodiment, the transformation between the reference frame of the object and the reference frame of the image is determined as described in U.S. patent application Ser. No. 16/570,915. In an embodiment, the reference of the camera is the same as the reference frame of the image. In an embodiment, the generated motion plan is based on the determined transformation between the reference frame of the image and the reference frame of the robot and the determined transformation between the reference frame of the object and the reference frame of the camera. According to an embodiment, the transformation between the reference frame of the image and the reference frame of the robot can be predetermined through use of calibrated measurements of a pre-specified series of robot arm locations within the reference frame of the image. In embodiments, the transformation between the reference frame of the image and the reference frame of the robot can also be determined/modified in real time by using observations of the robot with the camera to adjust an estimate of the transformation between the reference frame of the image and the reference frame of the robot. Embodiments may also utilize a neural network to determine the transformation between the reference frame of the object and the reference frame of the camera, i.e., image, as described in U.S. patent application Ser. No. 16/570,915.

Embodiments of the method 330 may prevent collisions between the robot and any object. For example, in an embodiment, the object is at least one of: an inanimate object undergoing ballistic motion; an inanimate object being acted upon by internal or external forces; a human; an animal; and another robot.

In an embodiment of the method 330, the location of the object detected at 331 is a six degree-of-freedom (6DOF) pose, including an x-position, y-position, z-position, roll, pitch, and yaw of the object, represented in the reference frame of the image. Further in embodiments, the location of the object can be any equivalent representation of location that can be transformed to a 6DOF pose in the reference frame of the robot. In an embodiment, predicting motion of the object at 332 is further based on the 6DOF pose of the object as represented in the reference frame. Further, an embodiment may predict the motion of the object based on a 6DOF velocity of the object that is determined from the 6DOF pose of the object. In such an embodiment, the 6DOF velocity is represented in a reference frame which can be transformed to the reference frame of the robot by at least one of a rotation and a transformation. According to an embodiment, the rotation and transformation are identity transformations.

Embodiments of the method 330 may employ a variety of methods to detect the location of the object at 331. According to an embodiment, detecting the location of the object at 331 includes processing the image of the object through a convolutional neural network to predict one or more parts of the object forming a two-dimensional (2D) position of the object in the image. Next, as part of determining the location 331, such an embodiment determines the 6DOF pose using (i) the 2D position of the object in the image, (ii) pixels of the object, and (iii) a depth map corresponding to the image of the object. In such an embodiment, determining the 6DOF pose using (i) the 2D position of the object, (ii) the depth map corresponding to the image of the object, and (iii) the pixels of the object may include fitting the depth map to a candidate three-dimensional (3D) model of the object, where dimensions of the 3D model match dimensions of the object.

Another embodiment of the method 330 detects the location of the object at 331 by processing the image of the object using a neural network to directly determine a six degree-of-freedom (6DOF) pose of the object in the reference frame of the image. In such an embodiment, processing the image of the object using the neural network includes at least one of (i) determining pixels in the image belonging to the object and determining the location, the 6DOF pose, of the object by matching the determined pixels to a silhouette and (ii) labelling each pixel in the image with a feature vector using a neural network trained to provide a spatially consistent set of features, wherein at least one of the feature vectors is matched to a feature vector of a reference model which is of the same class of the object to determine relative orientation and position of the at least one feature vector in the reference frame of the image or any other reference frame. In an embodiment, by matching the closest feature vectors of the reference model to points on the detected model and minimizing the distance between the points which have the most similar feature vectors, surfaces of the reference model and the detected model may be aligned. By aligning at least three points on a surface, the relative orientation of the object may be determined.

Embodiments of the method 330 may utilize any variety of methods to predict motion of the object based on at least one of the detected type of the object, the detected location of the object, and the model of object motion at 332. For instance, embodiments may process at least one image of the object using a neural network trained to estimate a future position of the object based on at least one image of the object having a reference frame. In such an embodiment, a different neural network may be utilized for each object class or a neural network may be utilized that is trained to function with all types of objects. The image(s) processed to estimate the future position may be the camera image used to determine the type and location of the object and may also include prior images of the object, i.e., images taken before the image used to determine the type and location of the object at 331.

An embodiment may also predict motion at 332 by processing the image of the object using a neural network trained to determine motion of the object based on a set of successive images. In such an embodiment, one of the successive images can be the image used to detect the type and the location of the object at 331.

Embodiments may utilize a variety of neural networks to predict motion of the object. For example, embodiments may utilize a fully convolutional neural network, a recurrent neural network, and a long-short-term memory recurrent neural network, amongst other examples. Embodiments may use networks trained to predict plausible future states when presented with a series of past states and rewarded when their predicted state closely matches the actual future state.

Yet another embodiment performs a simulation, e.g., a numerical approximation to solve the equations of the motion for the object and to predict motion of the object at 332. In such an embodiment, the simulation is performed using (i) a physics-based dynamics model of the object with velocity and acceleration inputs obtained by differentiating successive poses of the object and (ii) a Bayesian estimator configured to employ a fixed set of equations of motion which model motion of the object.

Embodiments may also predict motion at 332 by processing images of the object and determining the rate at which pixels associated with detected features on the object move in the frame of the image that (1) tracks motion of pixels associated with the object in the image and (2) determines center-of-mass velocity of the object.

Another embodiment examines, i.e., searches, a database of recorded candidate object motions and interpolates between the candidate object motions to determine the predicted motion of the object at 332. Further still, an embodiment predicts motion at 332 by determining occupancy of the object in one or more safety zones around the detected location of the object. In such an embodiment, occupancy is determined based on (i) object pose, which allows a 3D model of the object to determine if it is within the safety zone or (ii) transforming depth estimates of pixels which correspond to the object in the image, into a point cloud in the reference frame of the robot and determine if these points are within the safety zone.

An embodiment of the method 300 that predicts motion of the object at 332 by performing a simulation using a physics-based dynamics model further includes selecting equations to include in the physics-based dynamics model of the object from a set of plausible models by matching the detected type of the object to an element in a library of models. Such an embodiment selects the equations based on the type of the object. For example, if the object is a hockey puck, one equation will be selected or, if the object is a frying pan, another equation will be selected. In such an embodiment, the selected equation describes the motion for objects of that type.

Embodiments of the method 330 use a variety of techniques, alone or in combination, to detect the type of the object at 331. For instance, an embodiment of the method 330 processes the image of the object using a neural network classifier configured to predict object type based on one or more images of an object. Another embodiment of the method 330, at 331, performs color or hue matching on the image of the object to detect the type. Yet another embodiment detects, at 331, a label indicating object type in the image of the object. Example labels that may be employed include two-dimensional synthetic square markers and text, amongst other examples.

Further still, an embodiment of the method 330 processes the image of the object at 331 to detect motion of the object and identifies the type of the object based on the detected motion. Another embodiment detects the object type at 331 by comparing a depth image of the object to 3D object models to identify a matching object model, e.g., a model with a matching shape. Further, yet another embodiment detects the type of the object at 331 by processing a color image of the object using a neural network configured to predict object type based on one or more color images of an object. This neural network can segment each pixel into a specific object class or classify detected objects belonging to a specific class.

An embodiment of the method 330 generates a motion plan for the robot at 333 by selecting a given motion plan from a library of candidate motion plans, such that the motion of the robot avoids collision and satisfies the requirements of the action. Another embodiment generates the motion plan at 333 by re-planning, in real-time, a previously planned motion plan for the robot using a neural network configured to generate a motion plan using the predicted motion of the object as an input.

In an embodiment of the method 330, predicting motion of the object at 332 includes predicting collision of the robot and the object. Embodiments predict collision using at least one of: (i) geometric overlap based on 3D models of the robot and the object, (ii) a neural network, and (iii) bounding box overlap. Such embodiments use geometric comparisons to determine if any portion of the object intersects with another object. Further, such embodiments may utilize collision detection methods known to those of skill in the art.

An example embodiment of the method 330 predicts the motion of the object to be zero motion. Such an embodiment generates a motion plan for the robot that avoids the stationary object. In such an embodiment, no estimate of a future position of the object is used to determine a motion plan for the robot and the motion plan is determined based on the location of the object. Such a method (predicting the motion of the object to be zero motion) can be repeated continuously and every new location of the object, if, for example, the object is moving, can be used successively to modify a motion plan of the robot. Yet another embodiment of the method 330 generates a motion plan for the robot at 333 that includes stopping until the object is removed from an environment of the robot.

Embodiments may also generate motion plans for the robot as described in U.S. patent application Ser. No. 16/571,025. Further, embodiments of the method 330 may generate the motion for the robot at 333 based properties of the robot. For example, in an embodiment, the motion plan is further generated at 333 based on dynamic limits of the robot, where the dynamic limits of the robot are a function of the detected type of the object and the predicted motion of the object. Such functionality, generating a motion plan based on limits of the robot, e.g., torque, force, and position, may be implemented as described in the related application U.S. patent application Ser. No. 16/570,736.

Another embodiment of the method 330 includes selecting the model of object motion used at 332 based on the type of the object detected at 331. In such an embodiment, the type of object may be used to select a model of object motion. For example, if the object is a ball, a model of ball motion may be selected and utilized to predict motion of the of object.

Further, embodiments may utilize any variety of image types. For instance, in an embodiment, the image of the object is at least one of: a depth image of the object and a red, green, blue (RGB) image of the object.

Figure 4:
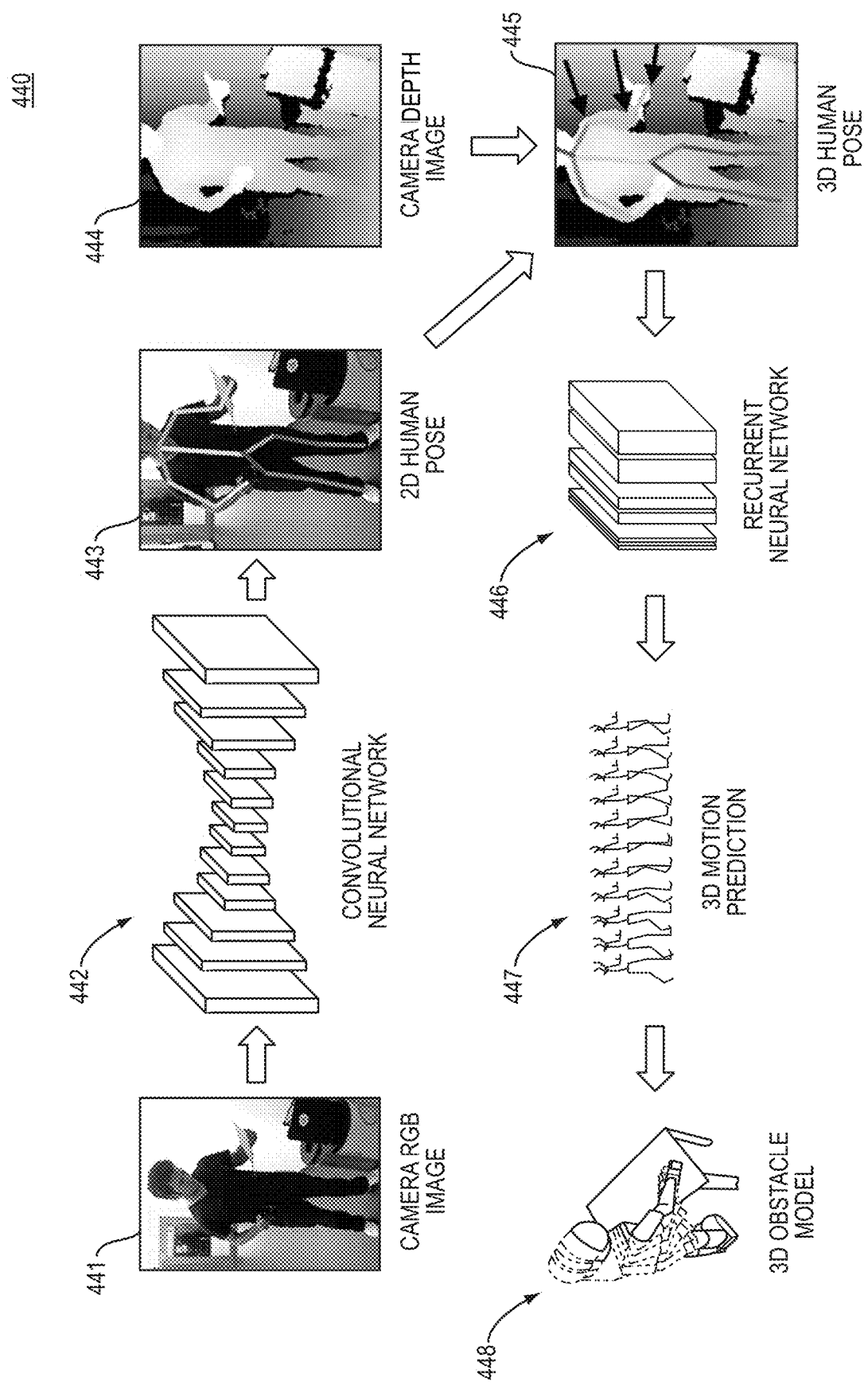
FIG. 4 is a flowchart depicting a method of human motion prediction for robot obstacle avoidance according to an embodiment.
Figure 5:
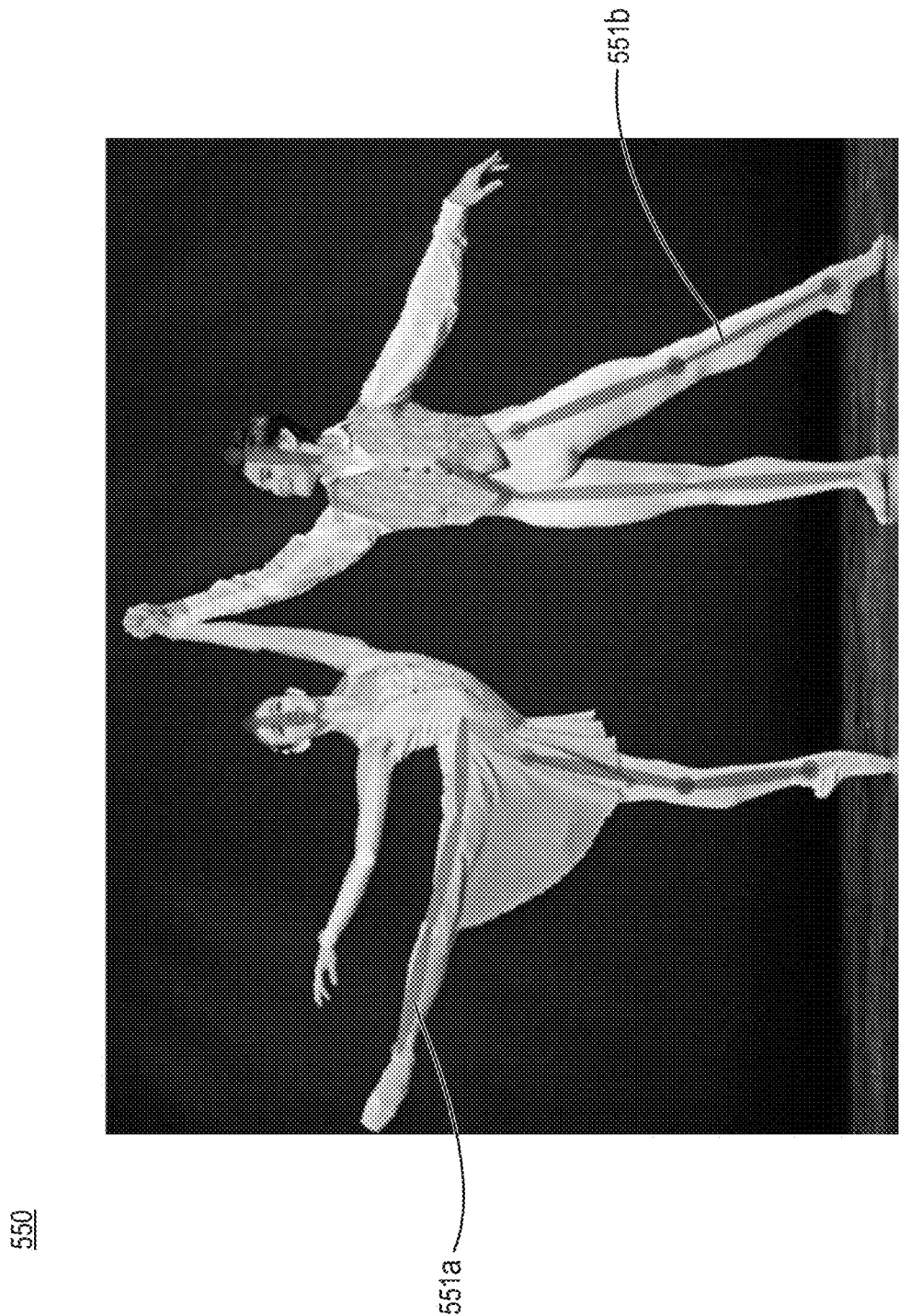
FIG. 5 is a picture illustrating a two-dimensional pose of an object determined in an embodiment.

FIG. 4 illustrates steps of a method 440 for predicting motion of an object to control a robot to avoid collision with the object. The method 440 begins by passing a red-green-blue (RGB) camera image 441 of the environment of the robot through a convolutional neural network 442 that predicts human body parts. In an embodiment, the functionality for predicting human body parts using the image and convolutional neural network may be as performed in Cao et al., "Realtime Multi-Person 2D Pose Estimation using Part Affinity Fields," which is incorporated by reference in its entirety. The output of the neural network from 442 is a human pose in 2D 443. FIG. 5 is a picture 550 illustrating example 2D human poses 551a and 551b that may be outputted by the convolutional neural network 442 in the method 440.

Figure 6:
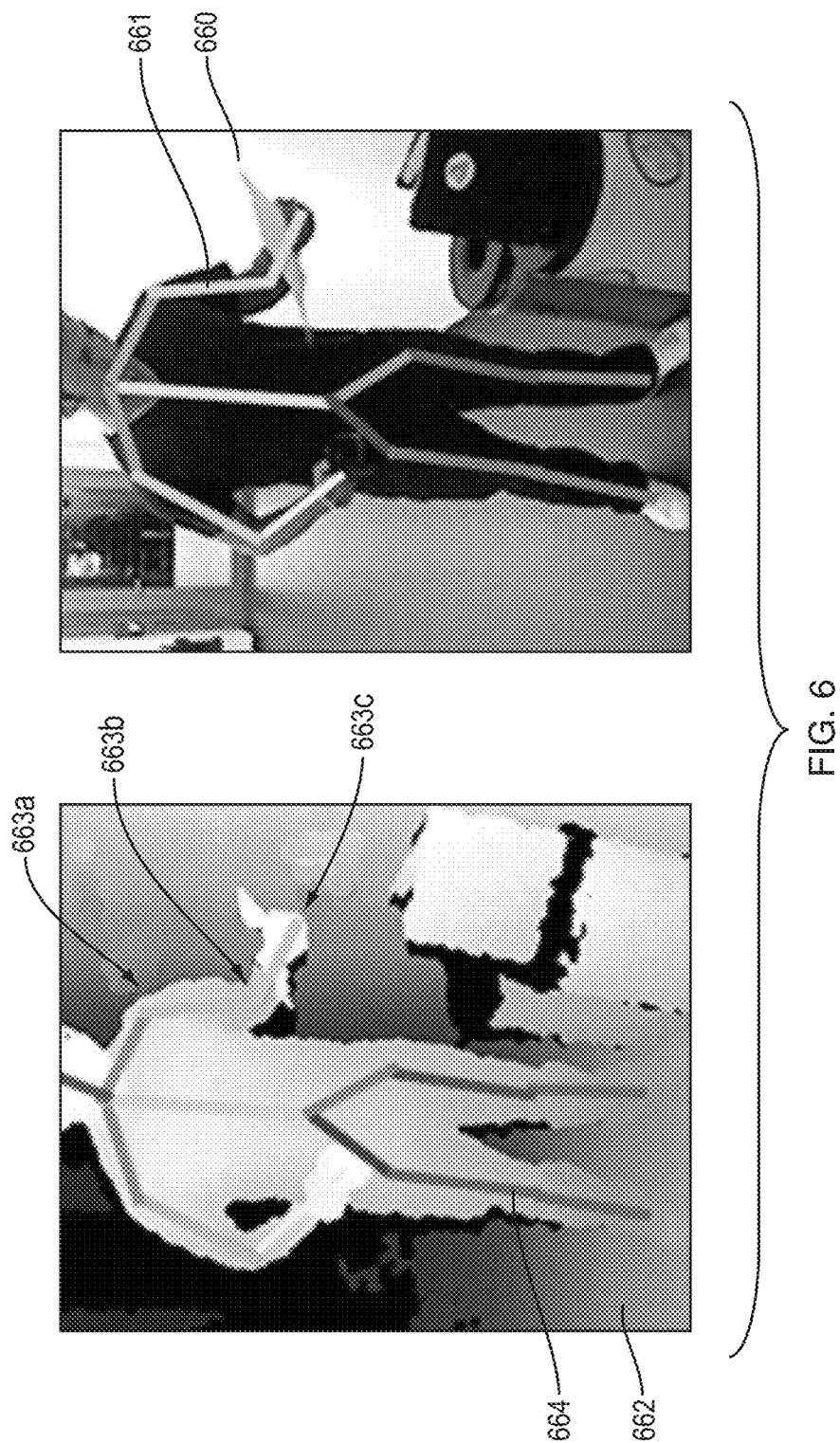
FIG. 6 is a picture depicting points in a depth map to evaluate according to an embodiment.

Returning to FIG. 4, while the convolutional neural network 442 outputs a 2D pose 443, in the method 440, a 3D pose is used for planning motions around the object, e.g., a robot's human co-worker. Thus, the method 440 continues by using a depth camera image 444 to determine the 3D pose 445. The 3D pose 445 is determined by evaluating the depth map 444 that corresponds to the RGB image 441 to gain information about the human's 3D pose. In an embodiment, evaluating the depth map 444 may include determining the 3D position of each joint of the human. According to an embodiment, the depth map 444 is evaluated at the body part boundary regions to determine the 3D position of each joint. FIG. 6 illustrates points in the depth map that may be evaluated to determine the 3D positions of each joint. FIG. 6 includes the picture 660 that illustrates the 2D pose 661. FIG. 6 also includes the depth map 662 that corresponds to the picture 660. In the depth map 662, the points 663a-c are evaluated to determine the 3D positions of each joint of the 3D human pose 664.

Returning to FIG. 4, to continue the method 440, the 3D human pose 445 is processed using a deep recurrent neural network (RNN) to predict future motion (e.g., generate the 3D motion prediction 447) of the human based on the past motion. In an example embodiment of the present disclosure, the method predicts the human motion as described in Martinez et al., "On Human Motion Prediction Using Recurrent Neural Networks."

The method 440 continues by determining, a model of future motion of the obstacle 448 based on the predicted future motion 447. With the model of future motion 448, embodiments can generate motion plans for a robot that avoid collision with objects, e.g., a human co-worker. In an embodiment, the collision free path planning is accomplished using the techniques described in U.S. patent application Ser. No. 16/570,100, the contents of which are incorporated herein by reference in their entirety. Moreover, in another embodiment, the motion plans are generated or selected to use a minimum required torque for a given motion, thus, limiting any potential damage from an impact. In an embodiment, the motions are planned using the functionality described in U.S. patent application Ser. No. 16/570,736, the contents of which are incorporated herein by reference. In another embodiment, the collision-free path planning is accomplished using rapidly-exploring random trees (RRT) and its derivative algorithms. The collision free planning may also be handled by graph-search methods such as Dijkstra's algorithm, depth-first-search, breadth-first-search, or A*. In another embodiment, the collision-free path planning is accomplished using trajectory optimization.

Embodiments of the present disclosure may be implemented in any robotic system in which avoidance with an obstacle and the robot is desired. Example systems include the food preparation environment 100. In the environment 100, embodiments as described herein, e.g., the method 330 described in relation to FIG. 3, may be implemented in the controller 114 so that the controller 114 can generate motion plans 132a-d that control motion of the robot arm 110 to avoid collisions with obstacles. In such an embodiment, the controller 114 may be communicatively coupled to a vision system (not shown) or the robot 110 may include a vision system to capture an image of the obstacle and a depth map corresponding to the image. According to an embodiment, the vision system may include a camera, depth sensor, RGBD sensor (combined RGB camera and depth sensor), Kinect®, lidar and camera, stereo vision, and camera and radar, amongst other examples.

Figure 7:
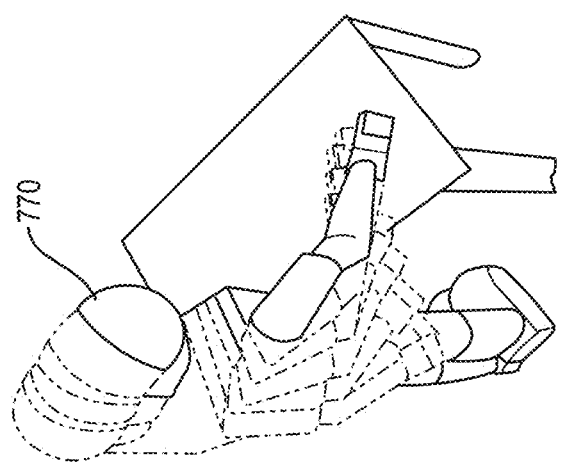
FIG. 7 depicts a swept volume of a predicted object motion used in an embodiment for collision avoidance.

Embodiments employ the predicted trajectory of the object, e.g., human, to model the human as an obstacle. A collision-free motion planner can then be used to generate a safe trajectory for the robot based on the generated model (e.g., the human modeled as an obstacle). In one embodiment, the obstacle (e.g., the human modeled as an obstacle) is constructed by integrating the volume the obstacle is predicted to occupy over some time period. This volume (e.g., the area of space occupied by the obstacle at every step during the time period) may be determined based on the predicted motion during the time period. FIG. 7 illustrates an example obstacle 770 generated using the predicted trajectory of the obstacle. The obstacle 770 is an integrated (e.g., swept) volume of the human. This example obstacle 770 can be used in embodiments to control motion of a robot to avoid colliding with the obstacle 770.

In another embodiment, a more accurate model of the obstacle can be used for collision avoidance. In such an embodiment, the obstacle, e.g., human, is modeled as a time-varying obstacle with the volume the obstacle occupies at each specific point in time or time step in a timed simulation. By adding time, as an additional dimension (degree of freedom) to the world model, a collision-free path planning method according to an embodiment finds a path which accommodates the motion of the obstacle as it is predicted to occur in time. While this adds complexity to the path planning, it provides a much larger set of possible trajectories, rather than blocking out all the volume which the obstacle is predicted to occupy during its incursion into the workspace of the robot. In an embodiment where the collision-free path planning uses a sampling-based planner, at each sample the time when the robot arrives at that point can be estimated and a model of the world which is consistent at that time is used. This adds complexity to the planning process because certain paths are feasible if executed at a certain rate but not at others. However, by reducing the problem to only consider path traversal speed instead of velocity for all joints, only a single additional degree of freedom is added to the problem instead of doubling the complexity as happens when all joint velocities are considered.

According to one embodiment, the generated model (e.g., time varying model or swept volume obstacle) is employed in a motion planning method which uses a combination of sampling and optimization based motion planners to avoid collision between the obstacle and the robot. Example planning methods that may be employed by embodiments are contained in Drake, and the open motion planning library (OMPL), both of which are open-source software which contain methods to solve motion planning problems.

Embodiments determine robot motion paths to avoid collisions, however, in one embodiment, if the desired robot action is no longer feasible due to the obstacle, the robot is stopped. Optionally, the robot or other system sends a signal to an operator indicating that the robot is not currently able to complete the task due to an obstacle.

In an example embodiment where a neural network is used for predicting motion of the object, i.e., human, the network is trained on examples of object motion that are for the appropriate domain for the task in question. For instance, in the example where the object being avoided is a human, the neural network is trained on examples of human motion in quick service restaurants (or the appropriate domain for the task in question). Such an embodiment predicts the long-term motion of key-points which are identified on the object and then estimates their motion into the future. This has been demonstrated in the paper "Learning to Generate Long-term Future via Hierarchical Prediction" by Ruben Villegas, et al. In *Proceedings of the 34th International Conference on Machine Learning (ICML)*, 2017 as well as in the paper "The pose knows: Video forecasting by generating pose futures." By Jacob Walker, et al. In The IEEE International Conference on Computer Vision (ICCV), October 2017.

In an embodiment where a recursive Bayesian estimator is used to predict motion, the motion of the obstacle is estimated after each sensor observation. In an embodiment where a physics-based dynamics model is used to predict motion, the physics-based model is used as the system model for the update step in a recursive Bayesian estimator. A variety of physics-based dynamics models may also be used to predict motion. The various physics-based dynamics models that may be used are all characterized by a model, which, upon given the current state of the system, predicts a future state based on the laws of physics. In one such embodiment, in order to choose which equations to include in the physics-based model, a library of plausible models is created, and the correct model is selected by matching the output of a neural net classifier which determines the object type to the appropriate model.

Embodiments can use a single sensor to track movement of the object being avoided and do not require dedicated wearable hardware for tracking the object. Further, as compared to existing methods for collision avoidance, a method, corresponding system, and non-transitory computer readable medium may anticipate the location of the object based on a forward model of the object's actions. This enables planning with a time-varying obstacle and reacting to object behavior. Further, anticipating future locations of the object using the model is advantageous because the model of object actions used to predict object behavior can be tuned for specific applications and conditions to improve performance. For example, if a human commonly enters the workspace to add ingredients to a container but does not typically move beyond a certain threshold in the environment, the robot motion can be tuned to never cross that threshold, ensuring that the human and the robot will rarely interact. This enables easy collaborative operation in most cases, improving the overall system performance. However, if the human crosses the threshold, in an atypical fashion, then the existing obstacle avoidance method can be used, albeit at a cost in computation time. Further, embodiments can use knowledge of likely tasks performed by the object, i.e., human, in the same vicinity to further improve the model of the future object actions. For example, in the case of a salad making robot, a human is likely to change the material bins or add or remove materials from one of the bins, this implies specific poses the human is likely to make and the model can be updated accordingly to predict this motion so the robot can react accordingly.

Advantages of embodiments include the capability to track the pose of an arbitrary number of objects for motion planning, relying on computer vision, not requiring dedicated wearable hardware for the object being avoided, and enabling more nuanced responses rather than simply reacting to the presence of an object. Further embodiments can determine a motion for a robot that considers the type of object being avoided. For instance, the type of the object can be considered when determining the motion of the object and the determined motion of the object can be used when determining the motion of the robot. Existing methods do not consider the type of object being avoided and how the object is going to move when attempting to avoid collisions between a robot and object.

Figure 8:
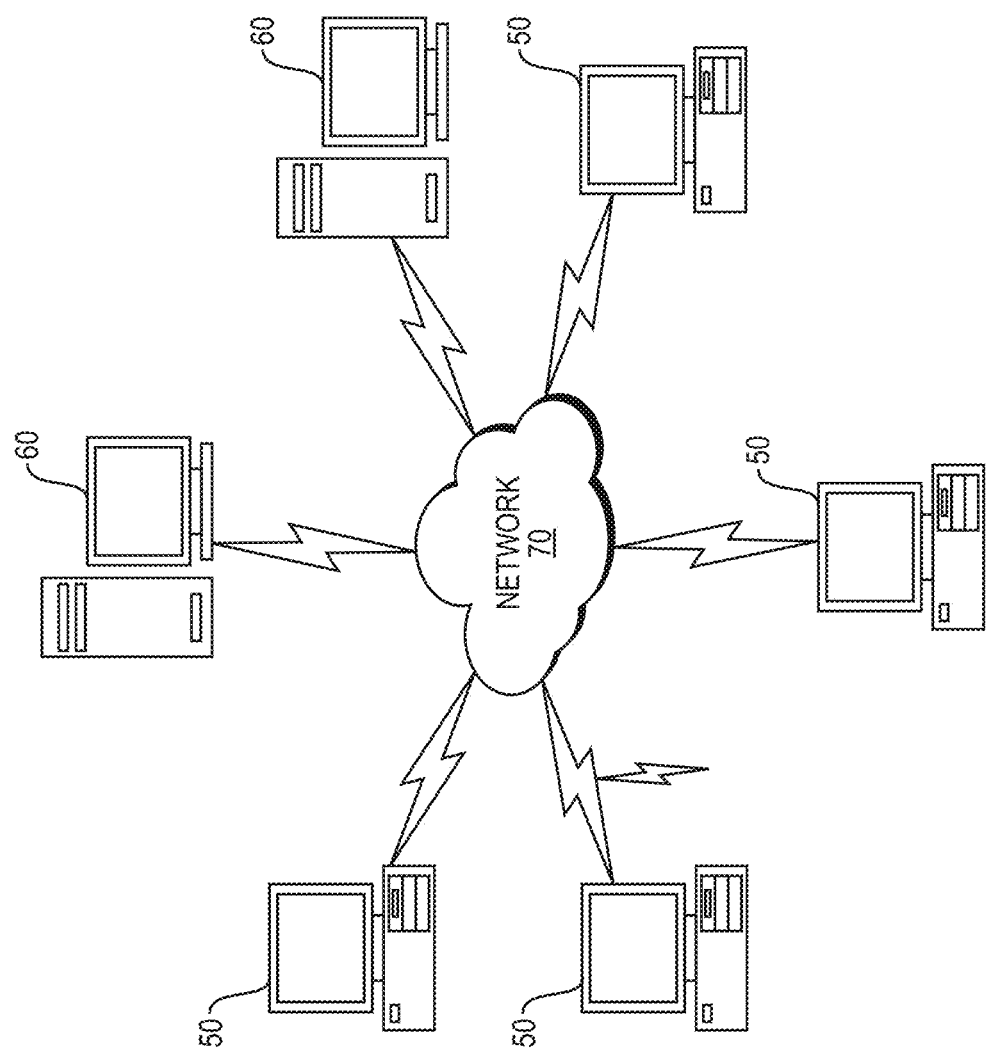
FIG. 8 depicts a computer network or similar digital processing environment in which embodiments of the present invention may be implemented.

FIG. 8 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 9:
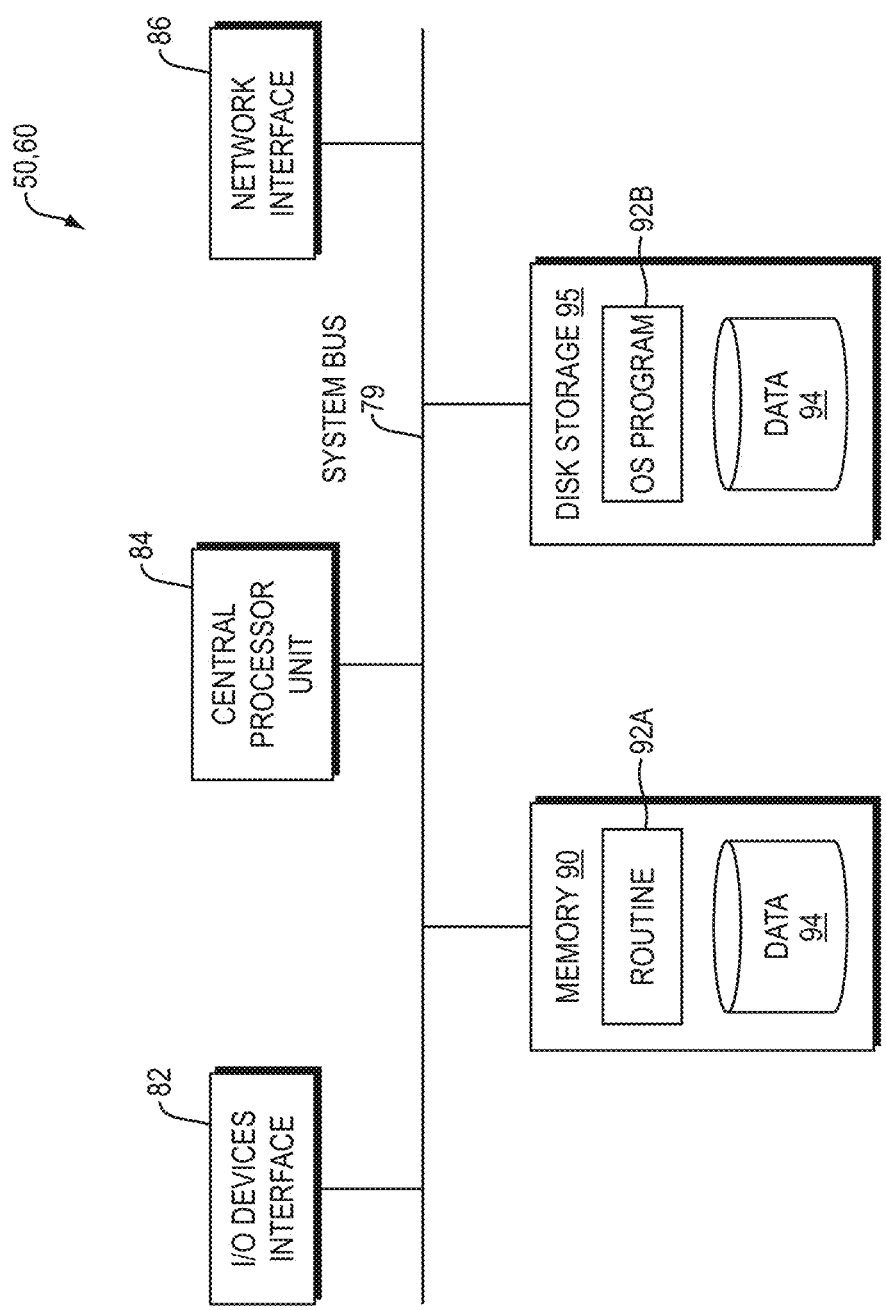
FIG. 9 is a diagram of an example internal structure of a computer in the environment of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92A and data 94 used to implement an embodiment of the present disclosure. Disk storage 95 provides non-volatile storage for computer software instructions 92B and data 94 used to implement an embodiment of the present disclosure. A central processor unit 84 is also attached to the system bus 79 and provides for the execution of computer instructions.

In one embodiment, the processor routines 92A and 92B and data 94 are a computer program product, including a non-transitory computer-readable medium (e.g., a removable storage medium such as one or more DVD-ROM's, CD-ROM's, diskettes, tapes, etc.) that provides at least a portion of the software instructions for an embodiment. The computer program product 92A and 92B can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92A and 92B.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method for controlling a robot for object avoidance, the method comprising:
   detecting a type and a location of an object based on a camera image of the object, the image having a reference frame;
   predicting motion of the object based on the detected type of the object, the detected location of the object, and a physics-based dynamics model of the object, the predicting motion comprising:
      selecting equations to include in the physics-based dynamics model of the object from a set of plausible models by matching the detected type of the object to an element in a library of models; and
      performing a simulation using both: (i) the physics-based dynamics model of the object, including the selected equations, and (ii) a recursive Bayesian estimator configured to employ the physics-based dynamics model of the object, including the selected equations, as a system model to update the recursive Bayesian estimator, the performing the simulation providing the predicted motion of the object; and
   generating a motion plan for a robot that avoids having the robot collide with the object based on:
      the predicted motion of the object;
      determining a transformation between the reference frame of the image and a reference frame of the robot, the determined transformation between the reference frame of the image and the reference frame of the robot enabling conversion from locations in the image to locations in relation to the robot; and
      determining a time varying model of the object based on the predicted motion of the object.

2. The method of claim 1, wherein generating the motion plan for the robot includes:
   determining a transformation between a reference frame of the object and a reference frame of the camera, wherein the generated motion plan is based on the determined transformation between the reference frame of the image and the reference frame of the robot and the determined transformation between the reference frame of the object and the reference frame of the camera.

3. The method of claim 1, wherein the object is at least one of:
   an inanimate object undergoing ballistic motion;
   an inanimate object being acted upon by internal or external forces;
   a human;
   an animal; and
   another robot.

4. The method of claim 1, wherein the detected location of the object is a six degree-of-freedom (6DOF) pose, including an x-position, y-position, z-position, roll, pitch, and yaw of the object, represented in the reference frame of the image.

5. The method of claim 4, wherein predicting motion of the object is further based on the 6DOF pose of the object as represented in the reference frame of the image.

6. The method of claim 4, wherein detecting the location of the object includes:
   processing the image of the object through a convolutional neural network to predict one or more parts of the object forming a two-dimensional (2D) position of the object in the image; and
   determining the 6DOF pose using the 2D position of the object in the image, pixels of the object, and a depth map corresponding to the image of the object.

7. The method of claim 6, wherein determining the 6DOF pose using the 2D position of the object, the depth map corresponding to the image of the object, and the pixels of the object includes:
   fitting the depth map to a candidate three-dimensional (3D) model of the object, where dimensions of the 3D model match dimensions of the object.

8. The method of claim 1, wherein detecting the location of the object comprises:
   processing the image of the object using a neural network to directly determine the six degree-of-freedom pose of the object in the reference frame of the image where, processing the image of the object using the neural network includes at least one of:

determining pixels in the image belonging to the object and determining the location of the object by matching the determined pixels to a silhouette; and labelling each pixel in the image with a feature vector, wherein at least one of the feature vectors is matched to a feature vector of a reference model of a class of the object to determine relative orientation and position of the at least one feature vector in the reference frame of the image.

9. The method of claim 1, wherein predicting motion of the object based on at least one of the detected type of the object, the detected location of the object, and the model of object motion comprises at least one of:

processing the image of the object using a neural network trained to estimate future position of the object based on at least one image of the object having a reference frame;

processing the image of the object using a neural network trained to determine motion of the object based on a successive set of images;

performing the simulation using (i) the physics-based dynamics model of the object with velocity and acceleration inputs obtained by differentiating successive poses of the object and (ii) the Bayesian estimator configured to employ a fixed set of equations of motion which model motion of the object;

processing images of the object using optical flow which tracks motion of pixels associated with the object in the image and determines center-of-mass velocity of the object;

examining a database of recorded candidate object motions and interpolating between the candidate object motions to determine the predicted motion of the object; and determining occupancy of the object in one or more safety zones around the detected location of the object, where occupancy is determined based on (i) object pose or (ii) transforming depth estimates of pixels in the image, which are segmented and determined to belong to the object, into a point cloud in the reference frame of the robot.

10. The method of claim 1, wherein detecting the type of the object comprises at least one of:

processing the image of the object using a neural network classifier configured to predict object type based on one or more images of an object;

performing color matching on the image of the object;

detecting a label indicating object type in the image of the object;

processing the image of the object to detect motion of the object and identify the type of the object based on the detected motion;

comparing a depth image of the object to 3D object models to identify a matching object model; and processing a depth image of the object using a neural network configured to predict object type based on one or more depth images of an object.

11. The method of claim 1, wherein generating a motion plan for the robot includes at least one of:

selecting a given motion plan from a library of candidate motion plans; and in real-time, re-planning a previously planned motion plan for the robot using a neural network configured to generate a motion plan using the predicted motion of the object as an input.

12. The method of claim 1, wherein predicting motion of the object further comprises predicting collision of the robot and the object using at least one of:

geometric overlap based on 3D models of the robot and the object;

a neural network; and bounding box overlap.

13. The method of claim 1, wherein the predicted motion of the object is zero motion.

14. The method of claim 1, wherein the generated motion plan for the robot includes stopping until the object is removed from an environment of the robot.

15. The method of claim 1, wherein the motion plan is further generated based on dynamic limits of the robot, where the dynamic limits of the robot are a function of the detected type of the object and the predicted motion of the object.

16. The method of claim 1, further comprising:

selecting the model of object motion based on the detected type of the object.

17. The method of claim 1, wherein the image of the object is at least one of:

a depth image of the object; and a red, green, blue (RGB) image of the object.

18. A system for controlling a robot for object avoidance, the system comprising:

a processor; and a memory with computer code instructions stored thereon, the processor and the memory, with the computer code instructions, being configured to cause the system to:

detect a type and a location of an object based on a camera image of the object, the image having a reference frame, by determining a six degree-of-freedom (6DOF) pose using pixels of the object, including an x-position, y-position, z-position, roll, pitch, and yaw of the object, represented in the reference frame of the image of the object;

predict motion of the object based on the detected type of the object, the detected location of the object, and a physics-based dynamics model of the object-, the predicting motion comprising:

selecting equations to include in the physics-based dynamics model of the object from a set of plausible models by matching the detected type of the object to an element in a library of models; and performing a simulation using both: (i) the physics-based dynamics model of the object, including the selected equations, and (ii) a recursive Bayesian estimator configured to employ the physics-based dynamics model of the object, including the selected equations, as a system model to update the recursive Bayesian estimator, the performing the simulation providing the predicted motion of the object; and generate a motion plan for a robot that avoids having the robot collide with the object based on:

the predicted motion of the object;

determining a transformation between the reference frame of the image and a reference frame of the robot, the determined transformation between the reference frame of the image and the reference frame of the robot enabling conversion from locations in the image to locations in relation to the robot; and determining a time varying model of the object based on the predicted motion of the object.

19. A non-transitory computer program product for controlling a robot for object avoidance, the computer program product comprising a computer-readable medium with computer code instructions stored thereon, the computer code instructions being configured, when executed by a processor, to cause an apparatus associated with the processor to:
- detect a type and a location of an object based on a camera image of the object, the image having a reference frame, by determining a six degree-of-freedom (6DOF) pose using pixels of the object, including an x-position, y-position, z-position, roll, pitch, and yaw of the object, represented in the reference frame of the image of the object;
- predict motion of the object based on the detected type of the object, the detected location of the object, and a physics-based dynamics model of the object-, the predicting motion comprising:
  - selecting equations to include in the physics-based dynamics model of the object from a set of plausible models by matching the detected type of the object to an element in a library of models; and
  - performing a simulation using both: (i) the physics-based dynamics model of the object, including the selected equations, and (ii) a recursive Bayesian estimator configured to employ the physics-based dynamics model of the object, including the selected equations, as a system model to update the recursive Bayesian estimator, the performing the simulation providing the predicted motion of the object; and
- generate a motion plan for a robot that avoids having the robot collide with the object based on:
  - the predicted motion of the object;
  - determining a transformation between the reference frame of the image and a reference frame of the robot, the determined transformation between the reference frame of the image and the reference frame of the robot enabling conversion from locations in the image to locations in relation to the robot; and
  - determining a time varying model of the object based on the predicted motion of the object.

* * * * *